United States Patent Office 3,519,629
Patented July 7, 1970

3,519,629
PIPERAZINOMETHYL-2,3-DIHYDRO-5(PYRIDYL)-1-BENZOTHIEPINS
Richard J. Mohrbacher, Fort Washington, Pa., assignor to McNeil Laboratories, Incorporated, a corporation of Pennsylvania
No Drawing. Application Aug. 16, 1968, Ser. No. 753,067, which is a division of application Ser. No. 636,570, Apr. 28, 1967, which in turn is a continuation-in-part of application Ser. No. 462,411, June 8, 1965. Divided and this application May 22, 1969, Ser. No. 842,067
Int. Cl. C07d 51/70
U.S. Cl. 260—268
6 Claims

ABSTRACT OF THE DISCLOSURE

The compounds are of the class of 2,3-dihydrobenzothiepins, useful for their pharmacological properties as hypotensive agents.

---

This application is a division of my co-pending application Ser. No. 753,067, filed Aug. 16, 1968, which in turn is a division of application Ser. No. 636,570, filed Apr. 28, 1967 (issued on May 13, 1969, as U.S. Pat. No. 3,444,176), which in turn is a continuation-in-part of application Ser. No. 462,411, filed June 8, 1965, now abandoned.

This invention relates to certain novel dihydrobenzothiepins. More particularly, it concerns dihydrobenzothiepins having the formula:

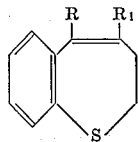

wherein R is a member of the group consisting of 2-pyridyl, 3-pyridyl and 4-pyridyl; $R_1$ is a member of the group consisting of hydrogen and diloweralkylaminomethyl; and the non-toxic acid addition salts and the therapeutically active loweralkyl quarternary ammonium derivatives thereof. R may be phenyl, in which event when $R_1$ is hydrogen, no acid addition salts or loweralkyl quarternary ammonium derivatives are possible. $R_1$ may be a member selected from the group consisting of piperidinomethyl, pyrrolidinomethyl and morpholinomethyl; likewise, $R_1$ may be a member selected from the group consisting of piperazinomethyl, N-loweralkyl-piperazinomethyl and N-aryl-piperazinomethyl.

As used herein loweralkyl may be straight or branch chained and have from 1 to 6 carbon atoms, such as, for example, methyl, ethyl, propyl, isopropyl, butyl, isobutyl, tertiary butyl and the like.

The therapeutically active non-toxic acid addition salts of the basic nitrogen containing compounds are prepared by treatment with an appropriate acid such as an inorganic acid, e.g., hydrochloric, hydrobromic, hydriodic, sulfuric, nitric or phosphoric; an organic acid such as acetic, propionic, glycolic, lactic, pyruvic, malonic, succinic, maleic, malic, fumaric, tartaric, citric, benzoic, mandelic, cinnamic, methane sulfonic, benzene sulfonic, salicylic, 2-phenoxybenzoic. Conversely, the salt form may be converted in the usual manner into the free base.

The novel basic nitrogen containing compounds may be converted into the corresponding quarternary ammonium compounds by reaction of the tertiary bases with alkylating agents, i.e., alkyl or aralkyl halides or esters formed by reacting alkanols with an oxygen-containing acid such as methyl iodide, ethyl bromide, propyl chloride; lower alkenyl halides—allyl bromide; dilower alkylsulfates—dimethylsulfate, diethylsulfate; lower alkylarylsulfonates—methyl p-toluenesulfonate or aralkyl halides—benzyl chloride. The quaternizing reaction may be performed in the presence or absence of a solvent, at room temperature or under cooling, at atomspheric pressure or in a closed vessel under pressure. Suitable solvents for this purpose are ethers such as diethylether and tetrahydrofuran, hydrocarbons such as benzene and heptane, ketones such as acetone, and butanone, loweralkanols such as ethanol, propanol or butanol; or organic acid amides such as formamide or dimethylformamide. When lower alkyl halogenides are used as quaternizing agents, diethyl ether and benzene are the preferred solvents.

The compounds of this invention have been found to possess valuable pharmacological properties. These compounds are useful as hypotensive agents as demonstrated by their ability to lower blood pressure in dogs following intraveneous administration. For example, with those compounds in which R is phenyl or 2-pyridyl and $R_1$ is hydrogen or dimethylaminomethyl, intraveneous administration of 10 mg./kg. of body weight to an anesthetized dog causes a blood pressure lowering of 48 mm. of Hg. The corresponding acid addition salts have the same utility as the basic nitrogen containing compounds.

The compounds of this invention are prepared by dehydrating the corresponding 5-substituted and 4-substituted-5-substituted - 2,3,4,5 - tetrahydro - 1 - benzothiepin-5-ols, wherein the 5 and 4 substituents are the respective members defined hereinabove. The dehydration is undertaken by mixing the precursor compounds with a suitable catalyst such as sulfuric acid, potassium acid sulfate or hydrochloric acid, heating the mixture at reflux, cooling, rendering the reaction mixture basic and extracting the dehydrated compounds with methylene chloride.

The 2,3,4,5- - tetrahydro - 1 - benzothiepin-5-ol precursors wherein R is phenyl or pyridyl and $R_1$ is hydrogen, loweralkylaminomethyl, diloweralkylaminomethyl, or cyclic aminomethyl, such as piperidinomethyl, pyrrolidinomethyl, morpholinomethyl, piperazinomethyl, N-loweralkyl-piperazinomethyl or N-arylpiperazinomethyl, are prepared by slowly adding a solution of a 4-substituted-3,4 - dihydro - 1 - benzothiepin-5(2H)-one (wherein the 4-substituent is an $R_1$ member as defined above) in a suitable solvent such as benzene to a solution of pyridyl lithium or phenyl lithium in a suitable inert organic solvent such as those mentioned hereinabove which has been cooled.

The following examples are intended to illustrate, but not to limit, the scope of the present invention.

EXAMPLE I

A solution of 2-pyridyl lithium is prepared by the addition of 20 g. (0.126 mole) of 2-bromopyridine to a stirred solution of butyl lithium (0.12 mole in 100 ml. of hexane) in 400 ml. of anhydrous ether at −40° C. After 15 minutes, 17.8 g. (0.1 mole) of 3,4-dihydro-1-benzothiepin-5(2H)-one in 100 ml. of benzene is added over a period of 5 minutes. During the next hour, the temperature rises gradually from −40° C. to room temperature. The slurry is poured into dilute, iced hydrochloric acid. Crystalline hydrochloride salt precipitates and is removed by filtration. Conversion of the acid salt to the free base yields 10.4 g. of crystalline free base. Basification of the original acidic filtrate followed by benzene extraction yields, after concentration of the organic layer, an additional batch of base crystals. Three recrystallizations from cyclohexane-hexane produces crystals; M.P., 79–80.5° C. The product is 2,3,4,5 - tetrahydro - 5 - (2-pyridyl) - 1 - benzothiepin-5-ol.

EXAMPLE II

A mixture of 17.8 g. (0.1 mole) of 3,4-dihydro-1-benzothiepin-5(2H)-one, 10.6 g. (0.13 mole) of dimethylamine hydrochloride, 3.96 g. (0.044 mole) of paraformaldehyde and 0.2 ml. of concentrated hydrochloric acid in 20 ml. of 95 percent ethanol is refluxed with stirring for 3 hours. After slight cooling 80 ml. of acetone is added. Cooling in the refrigerator yields white crystals. Two recrystallizations from 95 percent ethanol-acetone produces white crystals of 4-dimethylaminomethyl-3,4-dihydro-1-benzothiepin-5(2H)-one hydrochloride; M.P., 182–4° C.

EXAMPLE III

A solution of 58.8 g. (0.25 mole) of 4-dimethylaminomethyl-3,4-dihydro-1-benzothiepin-5(2H)-one in 500 ml. of benzene is added over a period of 10 minutes to a solution of 0.55 mole of phenyl lithium (prepared from bromobenzene and lithium) in 840 ml. of ether. The reaction mixture is stirred at reflux for 22 hours. After cooling, the mixture is decomposed with 300 ml. of water. The organic layer is separated and the aqueous phase is extracted with ether. The combined ethereal solution is washed with water, then with saurated brine, and dried over magnesium sulfate. After removal of the drying agent, benzene is added, causing precipitation of white crystals. One recrystallization from ethyl acetate-petroleum ether (30–60° C.) yields white crystals of 4-dimethylaminomethyl-2,3,4,5-tetrahydro-5-phenyl-1-benzothiepin-5-ol; M.P., 135–140° C.

EXAMPLE IV

A solution of 2-pyridyl lithium is prepared by the addition of 20 g. (0.126 mole) of 2-bromopyridine to a stirred solution of butyl lithium (0.12 mole in 100 ml. of hexane) in 400 ml. of anhydrous ether at −40° C. After 15 minutes 23.5 g. (0.1 mole) of 4-dimethylaminomethyl-3,4-dihydro-1-benzothiepin-5(2H)-one in 100 ml. of benzene is added over a period of 10 minutes. The temperature is gradually raised from −40° C. to reflux and maintained there for 22 hours. After cooling, the mixture is decomposed with 150 ml. of water. The organic layer is separated and the aqueous phase is extracted with ether. The combined ethereal solution is washed with water, then saturated brine, and dried over magnesium sulfate. After removal of the drying agent, the solution is evaporated to dryness to obtain 4-dimethylaminomethyl-2,3,4,5-tetrahydro-5-(2-pyridyl)-1-benzothiepin-5-ol.

EXAMPLE V

A solution of 17.8 g. (0.1 mole) of 3,4-dihydro-1-benzothiepin-5(2H)-one in 100 ml. of benzene is added over a period of 10 minutes to a solution of 0.2 mole of phenyl lithium (prepared from bromobenzene and lithium) in 500 ml. of anhydrous ether with cooling. During the next hour the temperature is allowed to rise gradually to room temperature. The mixture is decomposed with 150 ml. of water. The organic layer is separated and the aqueous phase is extracted with ether. The combined ethereal solution is washed with water, then with saturated brine, and dried over magnesium sulfate. After removal of the drying agent, and concentration of the organic phase, addition of hexane results in precipitation of 2,3,4,5-tetrahydro-5-phenyl-1-benzothiepin-5-ol.

EXAMPLE VI

Using the procedure of Example I and replacing 2-bromopyridine with equivalent amounts of 3-bromopyrdine and 4-bromopyridine, the products obtained are:
2,3,4,5-tetrahydro-5-(3-pyridyl)-1-benzothiepin-5-ol;
2,3,4,5-tetrahydro-5-(4-pyridyl)-1-benzothiepin-5-ol.

EXAMPLE VII

Using the procedure of Example II and replacing dimethylamine hydrochloride with equivalent amounts of the hydrochloride salt of diethylamine, dipropylamine, diisobutylamine, and dibutylamine, the products obtained are:
4 - diethylaminomethyl - 3,4 - dihydro - 1 - benzothiepin-5(2H)-one;
4 - dipropylaminomethyl - 3,4 - dihydro - 1 - benzothiepin-5(2H)-one;
4 - diisobutylaminomethyl - 3,4 - dihydro - 1 - benzothiepin-5(2H)-one;
4 - dibutylaminomethyl - 3,4 - dihydro - 1 - benzothiepin-5(2H)-one.

EXAMPLE VIII

Using the procedure of Example II and replacing dimethylamine hydrochloride with equivalent amounts of the hydrochloride salt of piperidine, pyrrolidine, morpholine, piperazine, N-methyl-piperazine, N-ethyl-piperazine, N-butyl-piperazine, and N-phenyl-piperazine, the products obtained are:

4-piperidinomethyl-3,4-dihydro-1-benzothiepin-5(2H)-one;
4-pyrrolidinomethyl-3,4-dihydro-1-benzothiepin-5(2H)-one;
4-morpholinomethyl-3,4-dihydro-1-benzothiepin-5(2H)-one;
4-piperazinomethyl-3,4-dihydro-1-benzothiepin-5(2H)-one;
4-N-methyl-piperazinomethyl-3,4-dihydro-1-benzothiepin-5(2H)-one;
4-N-ethyl-piperazinomethyl-3,4-dihydro-1-benzothiepin-5(2H)-one;
4-N-butyl-piperazinomethyl-3,4-dihydro-1-benzothiepin-5(2H)-one;
4-N-phenyl-piperazinomethyl-3,4-dihydro-1-benzothiepin-5(2H)-one.

EXAMPLE IX

Using the procedure of Example III and replacing 4-dimethylaminomethyl - 3,4 - dihydro - 1 - benzothiepin-5(2H)-one with equivalent amounts of each of the products of Example VII, the products obtained are:

4-diethylaminomethyl-2,3,4,5-tetrahydro-5-phenyl-1-benzothiepin-5-ol;
4-dipropylaminomethyl-2,3,4,5-tetrahydro-5-phenyl-1-benzothiepin-5-ol;
4-diisobutylaminomethyl-2,3,4,5-tetrahydro-5-phenyl-1-benzothiepin-5-ol;
4-dibutylaminomethyl-2,3,4,5-tetrahydro-5-phenyl-1-benzothiepin-5-ol.

EXAMPLE X

Using the procedure of Example III and replacing 4-dimethylaminomethyl - 3,4 - dihydro - 1 - benzothiepin-5(2H)-one with equivalent amounts of each of the products of Example VIII, the products obtained are:

4-piperidinomethyl-2,3,4,5-tetrahydro-5-phenyl-1-benzothiepin-5-ol;
4-pyrrolidonomethyl-2,3,4,5-tetrahydro-5-phenyl-1-benzothiepin-5-ol;
4-morpholinomethyl-2,3,4,5-tetrahydro-5-phenyl-1-benzothiepin-5-ol;
4-piperazinomethyl-2,3,4,5-tetrahydro-5-phenyl-1-benzothiepin-5-ol;
4-N-methyl-piperazinomethyl-2,3,4,5-tetrahydro-5-phenyl 1-benzothiepin-5-ol;
4-N-ethyl-piperazinomethyl-2,3,4,5-tetrahydro-5-phenyl-1-benzothiepin-5-ol;
4-N-butyl-piperazinomethyl-2,3,4,5-tetrahydro-5-phenyl-1-benzothiepin-5-ol;
4-N-phenyl-piperazinomethyl-2,3,4,5-tetrahydro-5-phenyl-1-benzothiepin-5-ol.

EXAMPLE XI

Using the procedure of Example IV and replacing 4-dimethylaminomethyl - 3,4 - dihydro - 1 - benzothiepin- 5(2H)-one with equivalent amounts of each of the products of Example VII, the products obtained are:

4-diethylaminomethyl-2,3,4,5-tetrahydro-5-(2-pyridyl)-1-benzothiepin-5-ol;
4-dipropylaminomethyl-2,3,4,5-tetrahydro-5-(2-pyridyl)-1-benzothiepin-5-ol;
4-diisobutylaminomethyl-2,3,4,5-tetrahydro-5-(2-pyridyl)-1-benzothiepin-5-ol;
4-dibutylaminomethyl-2,3,4,5-tetrahydro-5-(2-pyridyl)-1-benzothiepin-5-ol.

EXAMPLE XII

Using the procedure of Example IV and replacing 4-dimethylaminomethyl - 3,4 - dihydro - 1 - benzothiepin-5(2H)-one with equivalent amounts of each of the products of Example VIII, the products obtained are:

4-piperidinomethyl-2,3,4,5-tetrahydro-5-(2-pyridyl)-1-benzothiepin-5-ol;
4-pyrrolidinomethyl-2,3,4,5-tetrahydro-5-(2-pyridyl)-1-benzothiepin-5-ol;
4-morpholinomethyl-2,3,4,5-tetrahydro-5-(2-pyridyl)-1-benzothiepin-5-ol;
4-piperazinomethyl-2,3,4,5-tetrahydro-5-(2-pyridyl)-1-benzothiepin-5-ol;
4-N-methyl-piperazinomethyl-2,3,4,5-tetrahydro-5-(2-pyridyl)-1-benzothiepin-5-ol;
4-N-ethyl-piperazinomethyl-2,3,4,5-tetrahydro-5-(2-pyridyl)-1-benzothiepin-5-ol;
4-N-butyl-piperazinomethyl-2,3,4,5-tetrahydro-5-(2-pyridyl)-1-benzothiepin-5-ol;
4-N-phenyl-piperazinomethyl-2,3,4,5-tetrahydro-5-(2-pyridyl)-1-benzothiepin-5-ol.

EXAMPLE XIII

A 19.3 g. (0.075 mole) sample of 2,3,4,5-tetrahydro-5(2-pyridyl)-1-benzothiepin-5-ol is mixed with 300 ml. of 2 M sulfuric acid and heated at reflux temperature for 19 hours. After cooling, the material is carefully made basic and then is extracted with methylene chloride. The methylene chloride is removed in vacuo to give a black gum, which after several triturations with ether yields crystals. The crystals are recrystallized 2 times from 2-propanol to give white crystals of 2,3-dihydro-5-(2-pyridyl)-1-benzothiepin; M.P. 77–78.5° C.

EXAMPLE XIV

A solution of 24 g. (0.0767 mole) of 4-dimethylaminomethyl - 2,3,4,5 - tetrahydro - 5 - phenyl - 1 - benzothiepin-5-ol in 500 ml. of 2 M sulfuric acid is refluxed for 19 hours. An oil separates and crystallizes during the heating period. After cooling the solid is collected and recrystallized from acetone-methanol-ether to give a white, crystalline sulfate salt. One recrystallization from 2-propanol-ether yields white crystalline 4-dimethylamino-2,3-dihydro-5-phenyl-1-benzothiepin sulfate; M.P. 213° C.

EXAMPLE XV

Using the procedure of Example XIII and replacing 2,3,4,5-tetrahydro-5(2-pyridyl)-1-benzothiopin-5-ol with equivalent amounts of each of the following:

2,3,4,5-tetrahydro-5-phenyl-1-benzothiopin-5-ol;
4-diethylaminomethyl - 2,3,4,5 - tetrahydro-5-phenyl-1-benzothiepin-5-ol;
4-dipropylaminomethyl - 2,3,4,5 - tetrahydro-5-phenyl-1-benzothiepin-5-ol;
4-diisobutylaminomethyl - 2,3,4,5 - tetrahydro-5-phenyl-1-benzothiepin-5-ol;
4-dibutylaminomethyl-2,3,4,5-tetrahydro-5-phenyl-1-benzothiepin-5-ol.

The following products are obtained:

2,3-dihydro-5-phenyl-1-benzothiepin;
4-diethylaminomethyl-2,3-dihydro-5-phenyl-1-benzothiepin;
4-dipropylaminoethyl-2,3-dihydro-5-phenyl-1-benzothiepin;
4-diisobutylaminoethyl-2,3-dihydro-5-phenyl-1-benzothiepin;
4-dibutylaminomethyl-2,3-dihydro-5-phenyl-1-benzothiepin.

EXAMPLE XVI

Using the procedure of Example XIII and replacing 2,3,4,5-tetrahydro-5(2-pyridyl)-1-benzothiepin-5-ol with equivalent amounts of each of the following:

2,3,4,5-tetrahydro-5(3-pyridyl)-1-benzothiepin-5-ol;
2,3,4,5-tetrahydro-5(4-pyridyl)-1-benzothiepin-5-ol;
4-dimethylaminomethyl-2,3,4,5-tetrahydro-5(2-pyridyl)-1-benzothiepin-5-ol;
4-diethylaminomethyl-2,3,4,5-tetrahydro-5(2-pyridyl)-1-benzothiepin-5-ol;
4-dipropylaminomethyl-2,3,4,5-tetrahydro-5(2-pyridyl)-1-benzothiepin-5-ol;
4-diisobutylaminomethyl-2,3,4,5-tetrahydro-5(2-pyridyl)-1-benzothiepin-5-ol;
4-dibutylaminomethyl-2,3,4,5-tetrahydro-5(2-pyridyl)-1-benzothiepin-5-ol.

The following products are obtained:

2,3-dihydro-5(3-pyridyl)-1-benzothiepin;
2,3-dihydro-5(4-pyridyl)-1-benzothiepin;
4-dimethylaminomethyl-2,3-dihydro-5(2-pyridyl)-1-benzothiepin;
4-diethylaminomethyl-2,3-dihydro-5(2-pyridyl)-1-benzothiepin;
4-dipropylaminomethyl-2,3-dihydro-5(2-pyridyl)-1-benzothiepin;
4-diisobutylaminomethyl-2,3-dihydro-5(2-pyridyl)-1-benzothiepin;
4-dibutylaminomethyl-2,3-dihydro-5(2-pyridyl)-1-benzothiepin.

EXAMPLE XVII

Using the procedure of Example XIII and replacing 2,3,4,5-tetrahydro-5(2-pyridyl)-1-benzothiepin-5-ol with equivalent amounts of each of the following:

4-piperidinomethyl-2,3,4,5-tetrahydro-5-phenyl-1-benzothiepin-5-ol;
4-pyrrolidinomethyl-2,3,4,5-tetrahydro-5-phenyl-1-benzothiepin-5-ol;
4-morpholinomethyl-2,3,4,5-tetrahydro-5-phenyl-1-benzothiepin-5-ol;
4-piperazinomethyl-2,3,4,5-tetrahydro-5-phenyl-1-benzothiepin-5-ol;
4-N-methyl-piperazinomethyl-2,3,4,5-tetrahydro-5-phenyl-1-benzothiepin-5-ol;
4-N-ethyl-piperazinomethyl-2,3,4,5-tetrahydro-5-phenyl-1-benzothiepin-5-ol;
4-N-butyl-piperazinomethyl-2,3,4,5-tetrahydro-5-phenyl-1-benzothiepin-5-ol;
4-N-phenyl-piperazinomethyl-2,3,4,5-tetrahydro-5-phenyl-1-benzothiepin-5-ol.

The following products are obtained:

4-piperidinomethyl-2,3-dihydro-5-phenyl-1-benzothiepin;
4-pyrrolidinomethyl-2,3-dihydro-5-phenyl-1-benzothiepin;
4-morpholinomethyl-2,3-dihydro-5-phenyl-1-benzothiepin;
4-piperazinomethyl-2,3-dihydro-5-phenyl-1-benzothiepin;
4-N-methyl-piperazinomethyl-2,3-dihydro-5-phenyl-1-benzothiepin;
4-N-ethyl-piperazinomethyl-2,3-dihydro-5-phenyl-1-benzothiepin;
4-N-butyl-piperazinomethyl-2,3-dihydro-5-phenyl-1-benzothiepin;
4-N-phenylpiperazinomethyl-2,3-dihydro-5-phenyl-1-benzothiepin.

EXAMPLE XVIII

Using the procedure of Example XIII and replacing 2,3,4,5-tetrahydro-5(2-pyridyl)-1-benzothiepin-5-ol with equivalent amounts of each of the following:

4-piperidinomethyl-2,3,4,5-tetrahydro-5(2-pyridyl)-1-benzothiepin-5-ol;
4-pyrrolidinomethyl-2,3,4,5-tetrahydro-5(2-pyridyl)-1-benzothiepin-5-ol;
4-morpholinomethyl-2,3,4,5-tetrahydro-5(2-pyridyl)-1-benzothiepin-5-ol;
4-piperazinomethyl-2,3,4,5-tetrahydro-5(2-pyridyl)-1-benzothiepin-5-ol;
4-N-methyl-piperazinomethyl-2,3,4,5-tetrahydro-5(2-pyridyl)-1-benzothiepin-5-ol;
4-N-ethyl-piperazinomethyl-2,3,4,5-tetrahydro-5(2-pyridyl)-1-benzothiepin-5-ol;
4-N-butyl-piperazinomethyl-2,3,4,5-tetrahydro-5(2-pyridyl)-1-benzothiepin-5-ol;
4-N-phenyl-piperazinomethyl-2,3,4,5-tetrahydro-5(2-pyridyl)-1-benzothiepin-5-ol.

The following products are obtained:

4-piperidinomethyl-2,3-dihydro-5(2-pyridyl)-1-benzothiepin;
4-pyrrolidinomethyl-2,3-dihydro-5(2-pyridyl)-1-benzothiepin;
4-morpholinomethyl-2,3-dihydro-5(2-pyridyl)-1-benzothiepin;
4-piperazinomethyl-2,3-dihydro-5(2-pyridyl)-1-benzothiepin;
4-N-methyl-piperazinomethyl-2,3-dihydro-5(2-pyridyl)-1-benzothiepin;
4-N-ethyl-piperazinomethyl-2,3-dihydro-5(2-pyridyl)-1-benzothiepin;
4-N-butyl-piperazinomethyl-2,3-dihydro-5(2-pyridyl)-1-benzothiepin;
4-N-phenyl-piperazinomethyl-2,3-dihydro-5(2-pyridyl)-1-benzothiepin.

What is claimed is:

1. A member selected from the group consisting of 2,3-dihydro-1-benzothiepins having the formula:

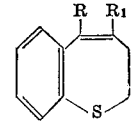

wherein R is a member of the group consisting of 2-pyridyl, 3-pyridyl and 4-pyridyl; $R_1$ is a member of the group consisting of piperazinomethyl, N-loweralkyl-piperazinomethyl and N-aryl-piperazinomethyl; and the non-toxic acid addition salts thereof.

2. 4-piperazinomethyl - 2,3 - dihydro-5(2-pyridyl)-1-benzothiepin.

3. 4-N-methyl-piperazinomethyl - 2,3 - dihydro-5(2-pyridyl)-1-benzothiepin.

4. 4-N-ethyl - piperazinomethyl - 2,3, - dihydro-5(2-pyridyl)-1-benzothiepin.

5. 4-N-butyl - piperazinomethyl - 2,3 - dihydro-5(2-pyridyl)-1-benzothiepin.

6. 4-N-phenyl - piperazinomethyl - 2,3 - dihydro-5(2-pyridyl)-1-benzothiepin.

References Cited

UNITED STATES PATENTS 3,287,370  11/1966  Mohrbacher et al. ___ 266—327
3,332,956  7/1967   Crenshaw _____ 260—268 X DONALD G. DAUS, Primary Examiner U.S. Cl. X.R.
424—250

PO-1050
(5/69)

UNITED STATES PATENT OFFICE
CERTIFICATE OF CORRECTION

Patent No. 3,519,629            Dated July 7, 1970

Inventor(s) Richard J. Mohrbacher

It is certified that error appears in the above-identified patent and that said Letters Patent are hereby corrected as shown below:

Column 6, lines 1 and 3, the word "diisobutylaminoethyl" should read -- diisobutylaminomethyl --.

November 3, 1970

(SEAL)
Attest:

Edward M. Fletcher, Jr.
Attesting Officer

WILLIAM E. SCHUYLER, JR.
Commissioner of Patents